United States Patent
Pancotti et al.

(10) Patent No.: US 7,857,255 B2
(45) Date of Patent: Dec. 28, 2010

(54) HELICOPTER WITH AN IMPROVED VIBRATION CONTROL DEVICE

(75) Inventors: Santino Pancotti, Gallarate (IT); Attilio Colombo, Vergiate (IT)

(73) Assignee: Agusto S.p.A., Samarate (IT)

( * ) Notice: Subject to any disclaimer, the term of this patent is extended or adjusted under 35 U.S.C. 154(b) by 1008 days.

(21) Appl. No.: 11/436,928

(22) Filed: May 15, 2006

(65) Prior Publication Data

US 2009/0321556 A1 Dec. 31, 2009

(30) Foreign Application Priority Data

May 16, 2005 (EP) .................................. 05425327

(51) Int. Cl.
*B64C 27/00* (2006.01)
(52) U.S. Cl. .................. 244/17.27; 244/54; 244/17.11; 248/550; 181/207; 188/380; 318/128
(58) Field of Classification Search ............... 244/54, 244/17.27, 17.11; 248/550; 181/207; 188/380, 188/379, 378; 318/128
See application file for complete search history.

(56) References Cited

U.S. PATENT DOCUMENTS

| | | | |
|---|---|---|---|
| 4,819,182 A | 4/1989 | King et al. | |
| 5,231,336 A | 7/1993 | van Namen | |
| 5,316,240 A | 5/1994 | Girard et al. | |
| 5,810,319 A | 9/1998 | von Flotow et al. | |

FOREIGN PATENT DOCUMENTS

EP 0501658 A1 9/1992

OTHER PUBLICATIONS

"Helitech 91: Review" Aircraft Engineering, (Bunhill Publications Ltd., London, United Kingdom), 63(11), Nov. 1991, p. 12-14.

*Primary Examiner*—J. Woodrow Eldred
(74) *Attorney, Agent, or Firm*—Mitchell P. Brook; Luce, Forward, Hamilton & Scripps LLP

(57) ABSTRACT

A helicopter having a rotor, a fuselage connected to the rotor by connecting means, and a control device for controlling vibration of the fuselage; the control device including generating means for generating signals associated with vibration of the fuselage, and actuating means for producing a force on the fuselage associated with the signals to reduce vibration; and the actuating means being carried by the connecting means.

8 Claims, 3 Drawing Sheets

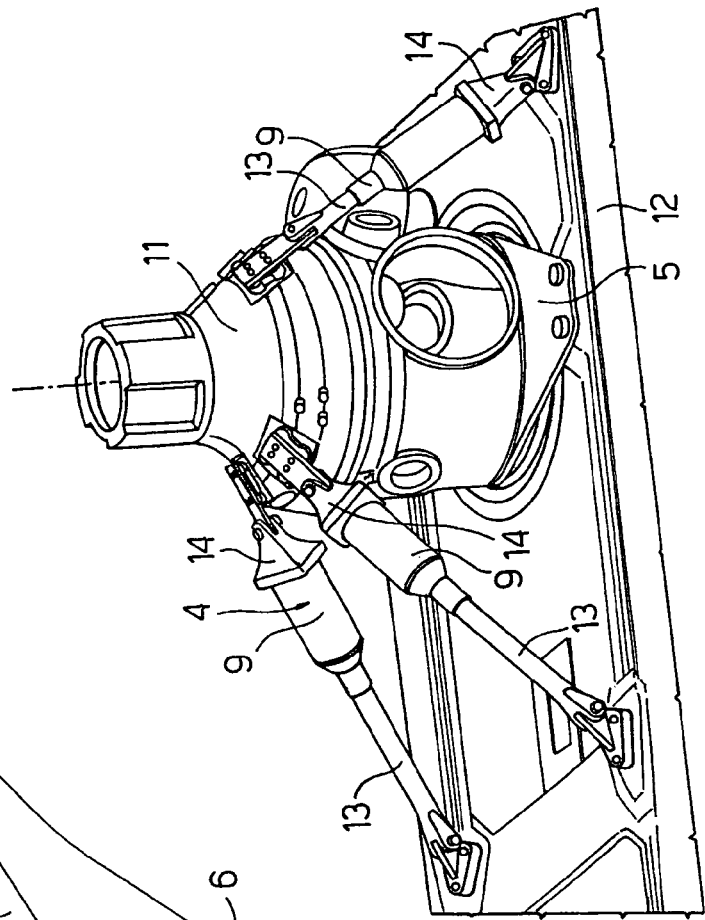
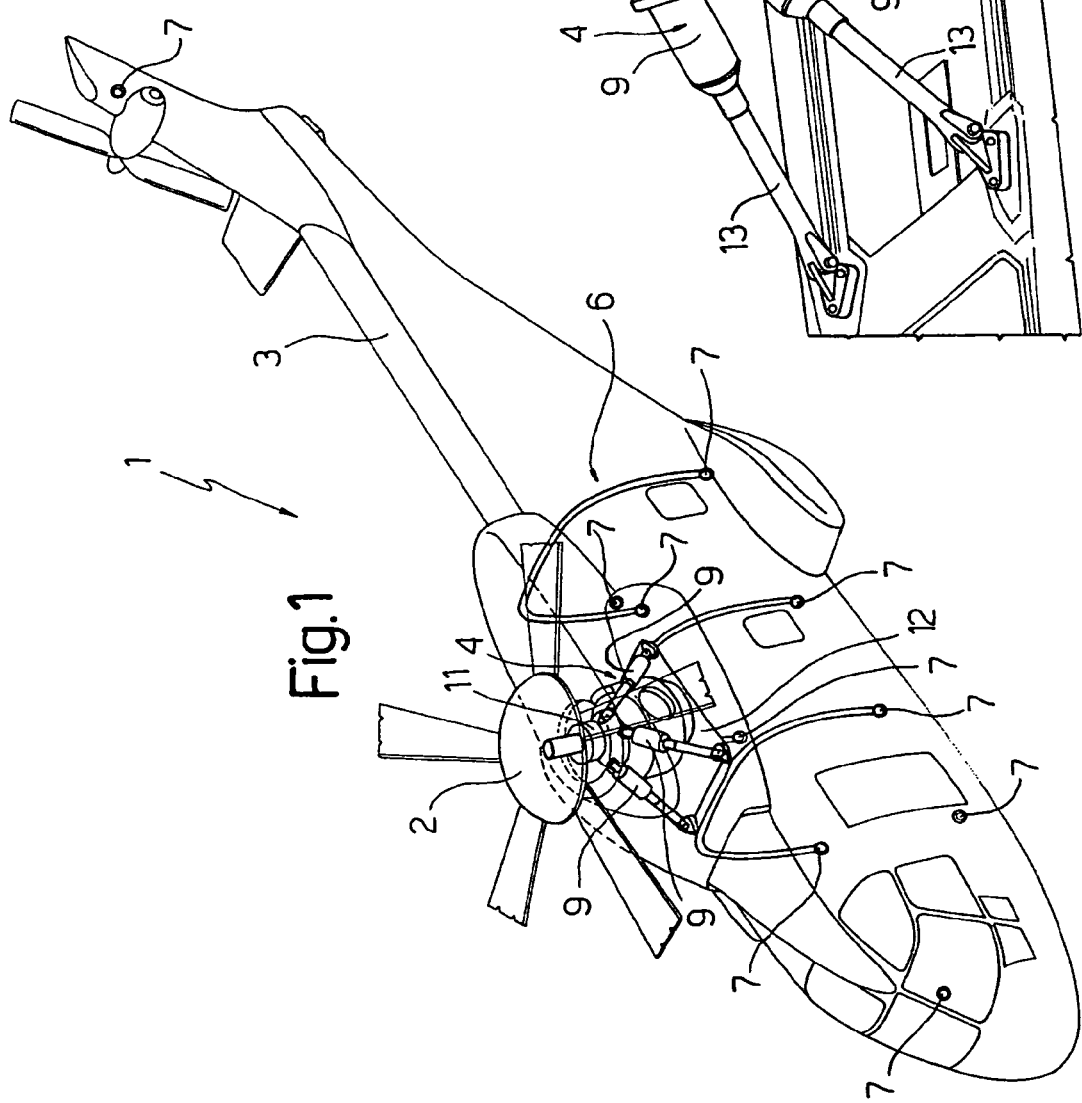

HELICOPTER WITH AN IMPROVED VIBRATION CONTROL DEVICE

The present invention relates to a helicopter with an improved vibration control device.

BACKGROUND OF THE INVENTION

As is known, a helicopter substantially comprises a fuselage defining a cockpit at the front and housing the equipment of the helicopter; a main rotor fitted to the top of a central portion of the fuselage, and which generates a force to sustain and control the direction of the helicopter; and a tail rotor cooperating with the main rotor to manoeuvre the helicopter.

The fuselage is connected to the main rotor, which sustains the entire helicopter, by means of a number of connecting rods, i.e. is "suspended" by the rods from the outer casing of the main rotor pylon.

In the following description, only the main rotor of the helicopter is referred to, and, for the sake of simplicity, is therefore referred to simply as "rotor" as opposed to "main rotor".

As is known, operation of the rotor induces vibration in the fuselage via the connecting rods, thus resulting in discomfort to the crew and dynamic stress of the fuselage itself.

To reduce such vibration, helicopters may be equipped with a control device for determining quantities associated with vibration of the fuselage, and generating a force field on the fuselage to counteract vibration.

More specifically, known control devices comprise a number of accelerometers for generating respective signals associated with acceleration of predetermined points of the fuselage; one or more actuators which act on the fuselage to generate said force field; and an electronic unit which receives the signals generated by the accelerometers, and generates a control signal for controlling the actuators.

Though efficient, control devices of the type described leave room for further improvement, particularly as regards the need felt in the industry to reduce the energy consumption, size and weight of the equipment of the helicopter, without imposing excessive design restrictions.

In particular, known actuators are unsatisfactory in reducing vibration of the fuselage areas further away from the areas in which the force field is applied, thus resulting in non-homogeneous vibration of different areas of the fuselage.

As a result, crew location is dependent on the areas in which the force field is applied by the actuators.

Moreover, vibration of the fuselage is greater in the areas further away from the point at which the fuselage is connected to the connecting rods. And reducing vibration in these areas requires that a particularly strong force field be generated by the actuators, and therefore actuators of greater weight, size, and energy consumption.

Since the force field generated by the actuators on the fuselage has an alternating pattern, the fuselage areas on which the force field is exerted are subjected to fatigue stress and must therefore be greater in size and weight.

SUMMARY OF THE INVENTION

It is an object of the present invention to provide a helicopter designed to eliminate the aforementioned drawbacks, and to satisfy the above demand in a straightforward, low-cost manner.

According to the present invention, there is provided a helicopter as claimed in the attached claims.

BRIEF DESCRIPTION OF THE DRAWINGS

A preferred, non-limiting embodiment of the present invention will be described by way of example with reference to the accompanying drawings, in which:

FIG. 1 shows a view in perspective, with parts removed for clarity, of a helicopter featuring a vibration control device in accordance with the present invention;

FIG. 2 shows a larger-scale view in perspective of a detail in FIG. 1;

DETAILED DESCRIPTION OF THE INVENTION

Figure 3:
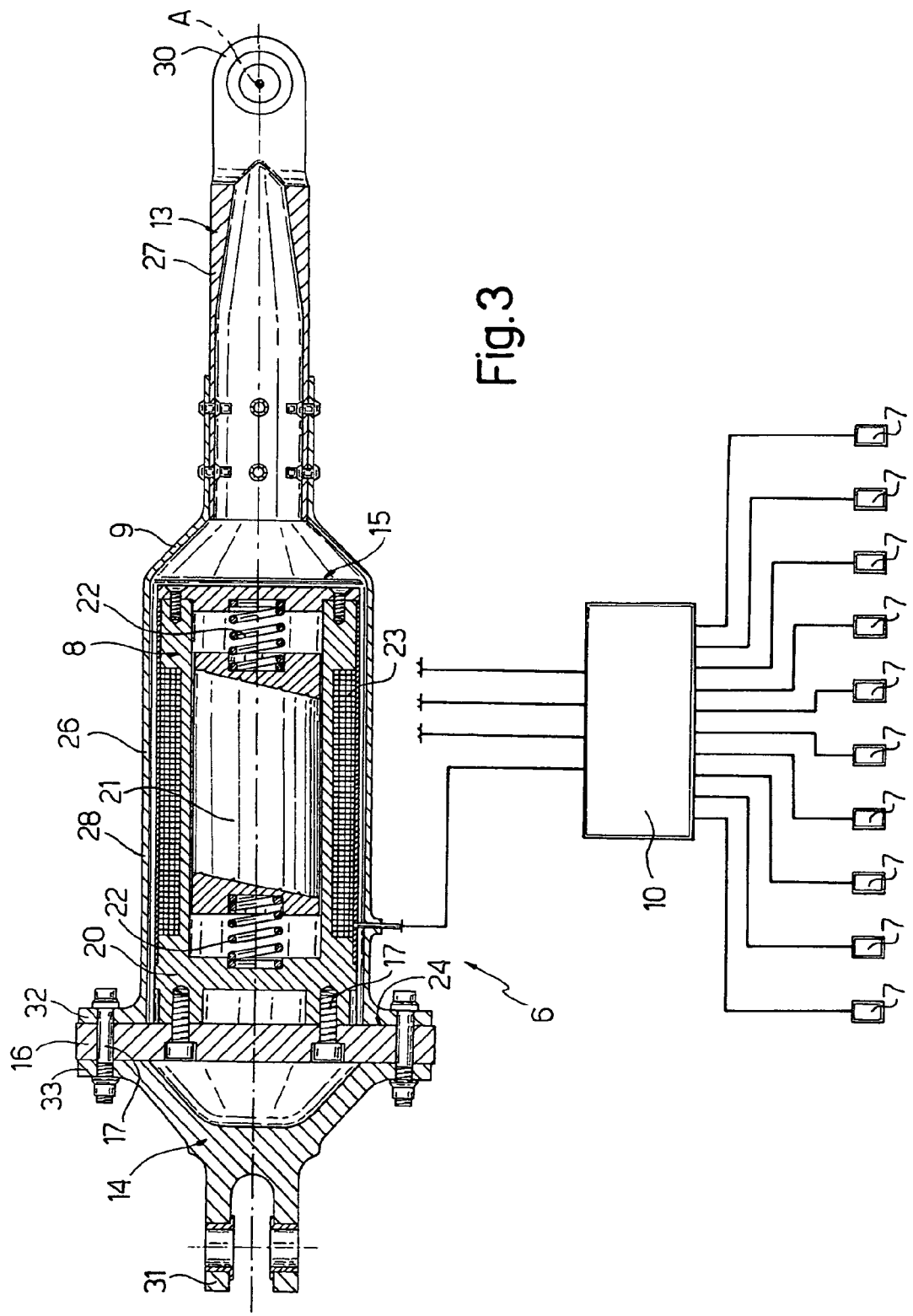
FIG. 3 shows a larger-scale axial section of the FIG. 1 vibration control device.

Number 1 in FIG. 1 indicates a helicopter substantially comprising a rotor 2, which generates a force to sustain the helicopter as a whole; a fuselage 3 for housing the crew and various equipment not shown; and a connection assembly 4 interposed between rotor 2 and fuselage 3 to transmit the sustaining force to fuselage 3.

Helicopter 1 also comprises a control device 6 (shown in FIGS. 1 and 3) for controlling vibration of fuselage 3, and which, in a preferred embodiment, determines the acceleration values of certain points of fuselage 3, and generates a force field on the fuselage to counteract vibration.

More specifically, control device 6 comprises a number of accelerometers 7 fixed to respective points of fuselage 3 and for generating respective signals associated with the acceleration of the relative fastening points; and a number of actuators 8 (shown in FIG. 3) for producing said force field.

Control device 6 also comprises an electronic control unit 10, which stores various characteristic parameters of helicopter 1, receives the signals generated by accelerometers 7, and itself generates a control signal for controlling actuators 8.

Actuators 8 are advantageously fitted directly by connection assembly 4.

More specifically, connection assembly 4 comprises a number of—in the example shown, four—rods 9, which house respective actuators 8 and transmit the sustaining force from an outer casing 11 of the known pylon of rotor 2 to a substantially flat top portion 12 of fuselage 3.

More specifically, casing 11 supports rotor 2 in rotary manner, and is fixed at the bottom to top portion 12 of fuselage 3 by a cross member 5 and by rods 9 on opposite sides of cross member 5.

Each rod 9 extends along a respective axis A sloping with respect to top portion 12 of fuselage 3 and to the axis of rotor 2, and has opposite ends 30, 31, one of which is connected to top portion 12, and the other to casing 11.

More specifically, each rod 9 comprises two members 13, 14, which extend longitudinally along axis A, define ends 30, 31 respectively, and are fixed—at respective ends 32, 33 axially opposite ends 30, 31—to a common plate 16 also of axis A. As shown in FIG. 3, ends 32 and 33 of members 13 and 14 are tightened on opposite sides of plate 16 and along axis A by means of a number of bolts.

Member 13 is hollow and open at end 32, so that plate 16 and end 30 define a closed cavity 15, inside member 13, for housing relative actuator 8.

Each rod 9 has a radially larger region 26, which is further away axially from end 30 than from end 31.

More specifically, region 26 comprises end 33 of member 14; plate 16; and an axial portion 28 of member 13 extending from end 32.

Member 13, in fact, increases in size radially from end 30 to end 32, and, more specifically, is defined by a portion 27 extending from end 30, and by portion 28 which is interposed axially between portion 27 and plate 16. Member 14 increases in size radially from end 31 to end 33, and is shorter in axial length than member 13.

In the example shown (FIGS. 1 and 2), two rods 9 have respective members 13 connected to top portion 12, and respective members 14 connected to casing 11; and the other two rods 9 have respective members 14 connected to top portion 12, and respective members 13 connected to casing 11.

The overall size of connection assembly 4 is thus minimized, by two rods 9 having respective radially larger regions 26 close to top portion 12, and the other two rods 9 having respective regions 26 close to casing 11.

With reference to FIG. 3, each actuator 8 is fixed to respective plate 16, and is activated by unit 10 to exert force along respective axis A on respective rod 9. The intensity and direction of the force depend on the output signal generated by unit 10, so that rod 9 transmits to fuselage 3 a force to reduce vibration of fuselage 3.

More specifically, each actuator 8 substantially comprises a shell 20 fixed, for example, by a number of screws 17, to plate 16 at a section 24 crosswise to axis A; a mass 21 movable, parallel to axis A, inside shell 20 and connected elastically to shell 20; and an electromagnetic field generator 23 controlled by unit 10 and for exerting on mass 21 a force along axis A.

More specifically, section 24 is the only section connecting actuator 8 to relative rod 9, so that actuator 8 and relative rod 9 only exchange forces at section 24 by means of screws 17.

Mass 21 is preferably made of metal, and is connected elastically to shell 20, for example, by means of two helical springs 22. Each spring 22 is interposed between a respective axial end of mass 21 and shell 20, and transmits a force, parallel to axis A, between mass 21 and shell 20.

In actual use, operation of rotor 2 generates a sustaining force transmitted by rods 9 to fuselage 3, and also induces in fuselage 3, via rods 9, vibration which is controlled by control device 6.

More specifically, unit 10 processes the control signal for each generator 23 on the basis of the signals associated with the vibration state of fuselage 3 and generated by accelerometers 7, and on the basis of the significant helicopter parameters stored in its memory.

On the basis of the respective control signal, each generator 23 produces a force along respective axis A to move respective mass 21. By means of respective springs 22, the movement of each mass 21 produces a force along respective axis A on respective shell 20, and which is transmitted by respective plate 16 to respective rod 9 at section 24.

Depending on said force, each rod 9 exerts a force on fuselage 3 to reduce the degree of vibration of fuselage 3.

Figure 4:
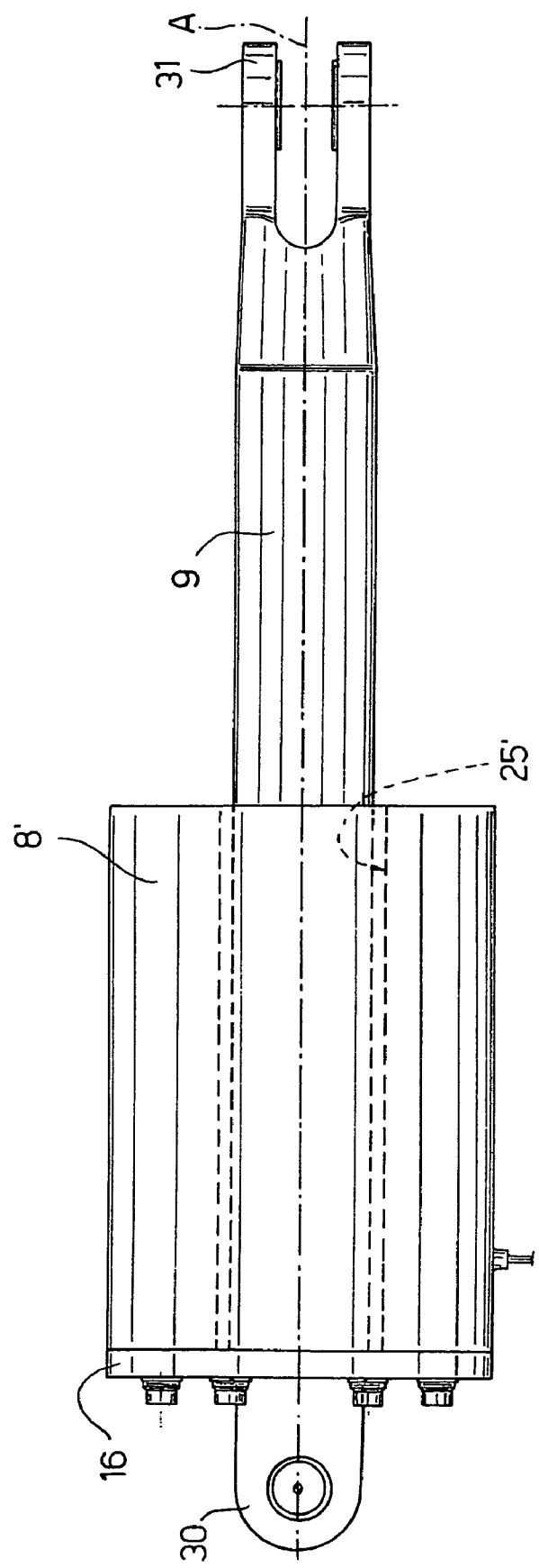
FIG. 4 shows an axial section of a further embodiment of the FIG. 3 control device.

The FIG. 4 variation relates to a different embodiment of an actuator, indicated as a whole by 8', which is fitted to a respective rod 9 of connection assembly 4. Actuator 81 is similar to actuator 8, and is described below only as regards the differences between the two. Any corresponding or equivalent parts of actuators 8 and 8' are indicated, where possible, using the same reference numbers.

More specifically, actuator 8' is toroidal in shape, defines a seat 25' coaxial with axis A and fitted through with rod 9, and is fixed to rod 9 at a portion of plate 16 projecting radially outwards of rod 9.

The advantages of helicopter 1 according to the present invention will be clear from the foregoing description.

In particular, control device 6 is effective in reducing vibration of fuselage 3, and in reducing the energy consumption, size and weight of the equipment of helicopter 1, without imposing excessive design restrictions.

Actuators 8, 8', in fact, are fitted to connection assembly 4, and produce a force field which reduces vibration from rotor 2 to fuselage 3 before the vibration spreads to fuselage 3.

More specifically, the force field is exerted in an area of top portion 12 of fuselage 3 connected to rods 9.

Consequently, the alternating pattern of the force field produces no stress of fuselage 3, which therefore requires no particular reinforcement resulting in increased weight and size. The fatigue stress in the area of top portion 12 connected to rods 9, on the other hand, calls for a smaller increase in weight, on account of this area being intrinsically heavier and larger to transmit the sustaining force from rods 9 to fuselage 3.

Control device 6 also consumes very little energy. In fact, by appropriately sizing springs 22 and mass 21, the natural frequency of each actuator 8, 8' can be tuned to the dominant frequency of the field of alternating forces generated by rotor 2 and transmitted to fuselage 3. In such conditions, very little force need be exerted by each generator 23 on respective mass 21 to achieve an effective reduction in vibration of fuselage 3.

Moreover, by acting before vibration is transmitted to fuselage 3, control device 6 provides for homogeneously controlling vibration of fuselage 3, so that the location of actuators 8, 8' does not particularly condition crew accommodation within fuselage 3.

Finally, since each actuator 8, 8' only exchanges forces with respective rod 9 at respective section 24, rods 9 and actuators 8, 8' are not subjected to particularly severe tensile/compressive stress, and therefore require no particular reinforcement resulting in increased weight and size.

Clearly, changes may be made to helicopter 1 without departing from the protective scope defined in the accompanying Claims.

The invention claimed is:

1. A helicopter comprising a rotor, a fuselage connected to said rotor by connecting means, and a control device for controlling vibration of said fuselage; said control device comprising generating means for generating signals associated with vibration of said fuselage, and actuating means for producing a force on said fuselage associated with said signals to reduce said vibration;

said connecting means comprising at least one stationary rod extending along an axis and being connected, at opposite ends with respect to said axis, to said rotor and to said fuselage;

said actuating means comprising at least one actuator connected to said rod;

characterized in that said actuator exchanges forces with and is connected to said rod at only one section crosswise to said axis;

said actuator comprising:
a shell; and
a mass connected elastically to said shell, and movable within said shell about said rod;

said connecting means comprising only one plate which is connected to said shell and to said rod;

said shell being connected to and exchanging forces with said rod at said only one section.

2. A helicopter as claimed in claim 1, characterized in that said actuator is housed inside a cavity of said rod.

3. A helicopter as claimed in claim 1, characterized in that said actuator is located outside said rod.

4. A helicopter as claimed in claim 3, characterized in that said actuator defines a through seat through which said rod extends coaxially.

5. A helicopter as claimed in claim 2, characterized in that said actuating means further comprise electromagnetic force generators for exerting on said mass a force having a component parallel to said axis.

6. A helicopter as claimed in claim 3, characterized in that said actuating means further comprise electromagnetic force generators for exerting on said mass a force having a component parallel to said axis.

7. A helicopter as claimed in claim 4, characterized in that said actuating means further comprise electromagnetic force generators for exerting on said mass a force having a component parallel to said axis.

8. A helicopter as claimed in claim 2, characterized in that said each rod comprises:

- a first hollow element which houses said actuator and has a first end connected to one of said rotor and said fuselage;
- a second element which has a first end connected to the other one of said rotor and said fuselage;
- said first and second element being connected at relative second ends, opposite to relative first ends, to said plate.

* * * * *

UNITED STATES PATENT AND TRADEMARK OFFICE
CERTIFICATE OF CORRECTION

PATENT NO.       : 7,857,255 B2
APPLICATION NO.  : 11/436928
DATED            : December 28, 2010
INVENTOR(S)      : Santino Pancotti and Attilio Colombo Page 1 of 1

It is certified that error appears in the above-identified patent and that said Letters Patent is hereby corrected as shown below:

Title page, item (73) replace the existing text with the following:

Agusta S.p.A., Samarate (IT)

Signed and Sealed this
Thirtieth Day of August, 2011

David J. Kappos
*Director of the United States Patent and Trademark Office*